April 21, 1925.  E. D. HURLEY  1,534,957
MITER MACHINE
Filed May 29, 1924  3 Sheets-Sheet 1

April 21, 1925.

E. D. HURLEY 1,534,957

MITER MACHINE

Filed May 29, 1924

Inventor
E. D. Hurley

April 21, 1925.

E. D. HURLEY

MITER MACHINE

Filed May 29, 1924

Inventor
E. D. Hurley
Atty

Patented Apr. 21, 1925.

1,534,957

UNITED STATES PATENT OFFICE.

ELMER D. HURLEY, OF SWEETWATER, TEXAS.

MITER MACHINE.

Application filed May 29, 1924. Serial No. 716,749.

*To all whom it may concern:*

Be it known that ELMER D. HURLEY, a citizen of the United States, residing at Sweetwater, in the county of Nolan and State of Texas, has invented certain useful Improvements in Miter Machines, of which the following is a specification, reference being had therein to the accompanying drawing.

The purpose of the present invention is to provide, in a miter machine, a construction which will hold the material to be cut in the exact position when in place, the machine also including a construction whereby miters of various angles may be cut.

Another purpose is to provide a miter machine including means whereby the support (which carries the material to be mitred) may be moved practically universally, that is, laterally toward either side in a horizontal direction, or tilted up and down at either end, or tilted backward, for cutting miters of various angles. It is possible with this character of machine to cut any angle of miter without calculations on the part of the operator.

Still another purpose is the provision of means for permitting the tilting back of the material support for the purpose of cutting upper bevels and for mitering material for molds, and for molds around columns that are larger at the base than at the top.

In machines heretofore used, saw guides are placed on pivots and, while this construction will permit of cuts the same as produced by the present device as long as cutting straight across the material, it will not permit of the degree of cut when the saw guide is disposed out of alignment with zero. In fact, in the present machine, it is a further purpose to provide means whereby the saw operates perpendicularly and the material set at the angle desired to obtain the proper cut without calculations.

The whole purpose of the present machine is to provide a construction whereby the material itself is adjusted to insure the proper miter cut, excepting when it is desired for cutting on an angle in a horizontal direction, whereas in this latter case the saw is moved pivotally in a horizontal direction on a vertical axis.

A still further purpose is the provision of means for holding the various parts in different adjusted positions.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 5 is a detail sectional view through one of the saw guides.

Figure 6 is a detail view in perspective of the shaft or rod 9, showing a short shaft 10 carried by its rear end.

Figure 1:
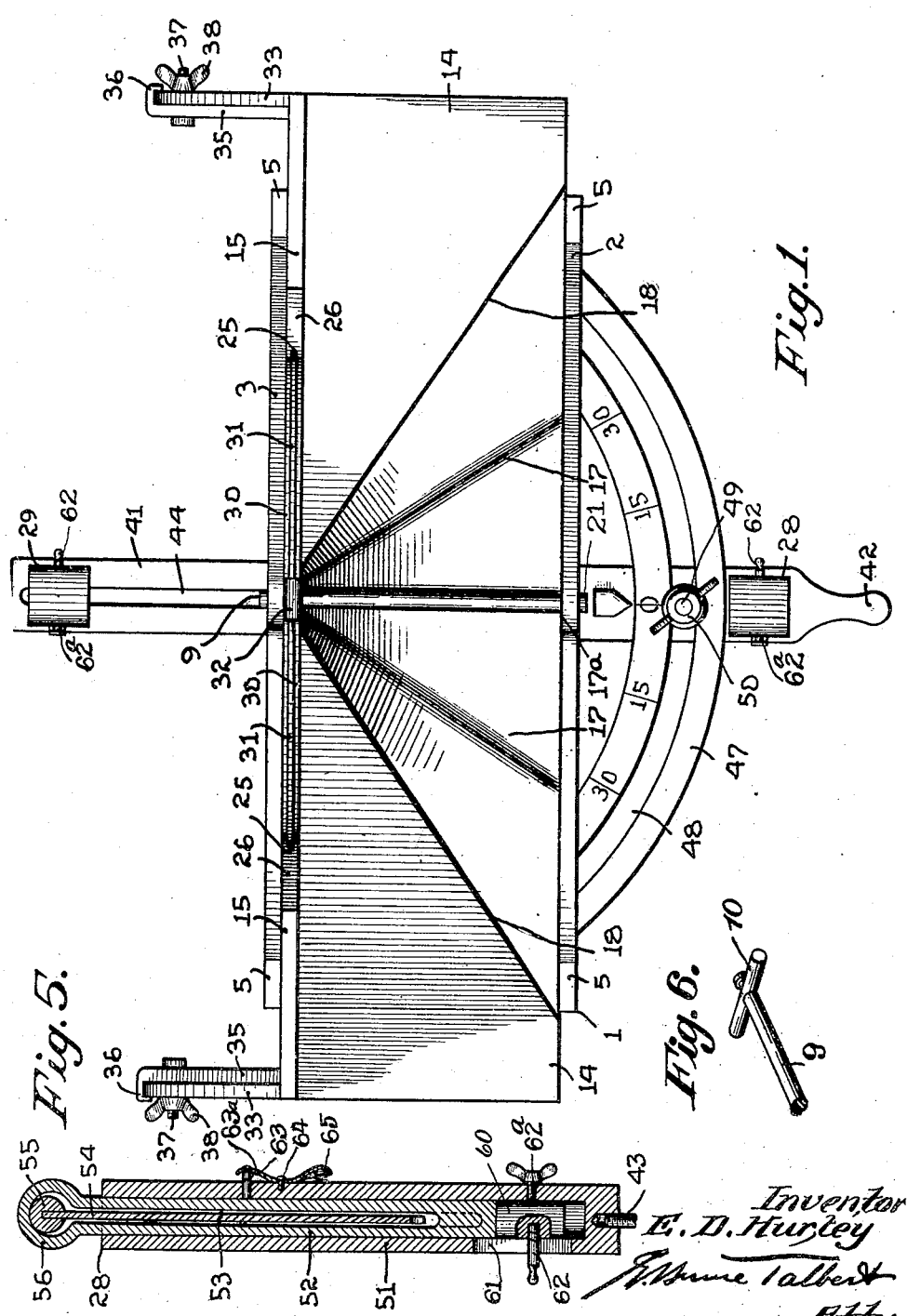
Figure 1 is a plan view of the improved miter machine constructed in accordance with the invention.
Figure 2:
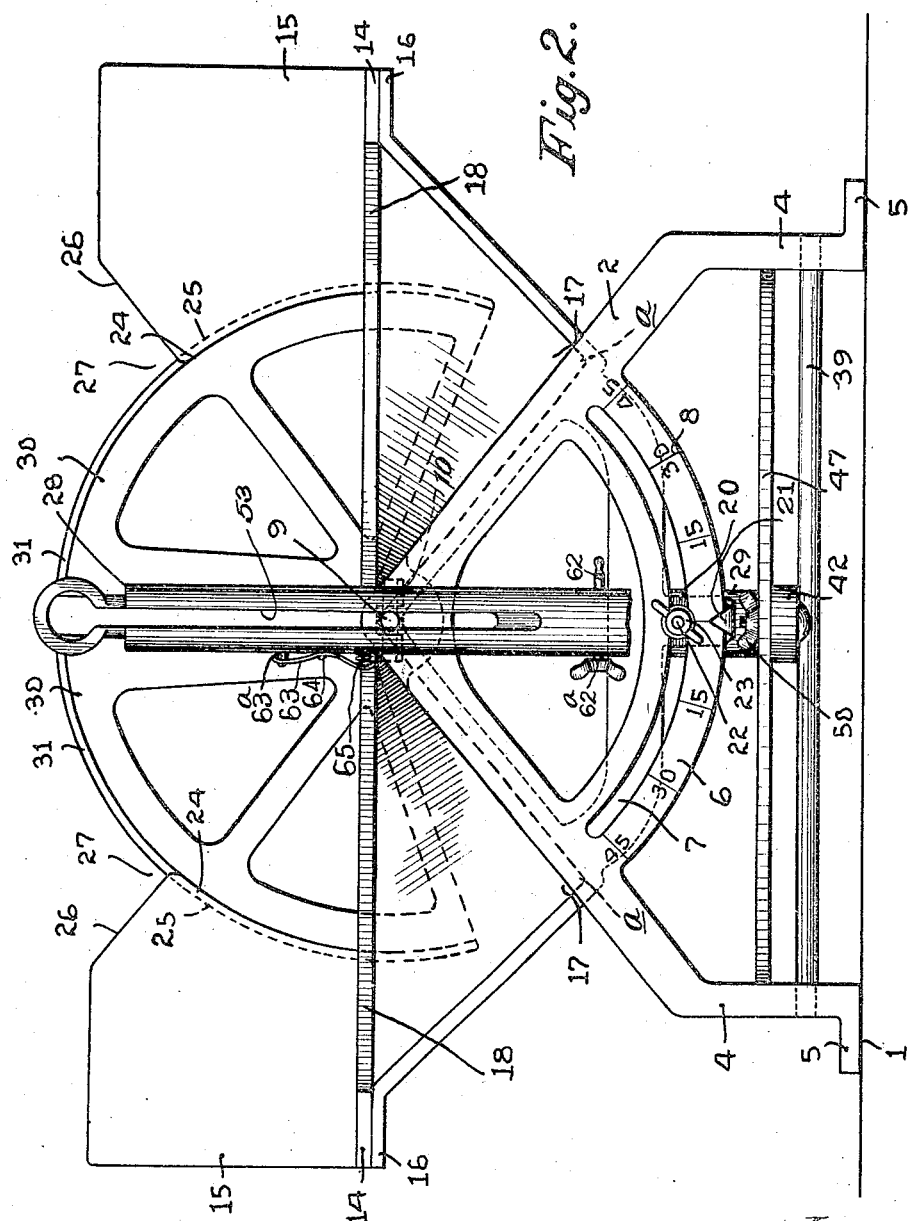
Figure 2 is a view in front elevation.

Referring to the drawings, 1 designates a frame composed of a front upright and a rear upright. The front and rear uprights 2 and 3 are of V-shaped contour and have depending legs 4 provided with feet 5. The converging bars of the front upright are connected integrally by means of a protractor bar 6 which is slotted, as shown at 7, and is provided with graduations 8.

Mounted in bearings of the upper apexes of the upper uprights 2 and 3 is a shaft or rod 9, the rear end of which carries a transverse short shaft 10. A material or work support is provided which comprises a main base 13 and a sub-base 16 which are hingedly united by means of the hinge rolls 16$^a$ and 16ᵇ and the opposed axially aligned shafts 16ᶜ. These shafts have their adjacent ends fixed in the rolls 16ᵃ.

The main base comprises the bottoms 14 and the backs 15 respectively integrally connected. In other words, the bottom 14 on one side of the rod or shaft 9 is integral with its adjacent back 15 by means of the hinge roll 16ᵇ. When the entire work support is in a horizontal position, especially the sub-base 16, the hinge shafts 16ᶜ align axially with the transverse short shaft or rod 10. Obviously, the bottoms and the back 14 and 15 move together when tilted on the rods or hinge pins or shafts 16ᶜ, and constitute means for the support of the work or material to be cut.

The sub-base 16 is provided on each side of its fulcrum 9 with V-shaped depressions 17, the bottoms of which merge from points, as at $a$, upwardly and inwardly toward the rear portion of the shaft or fulcrum. In this way, the sub-base 16 is caused to be formed with a central V-shaped raised portion 17ᵃ, the apex of which fulcrums upon the rod or shaft 9, allowing the sub-base 16 to tilt up and down at each end. When one end tilts upwardly, its opposite end tilts downwardly and vice versa.

Figure 3:
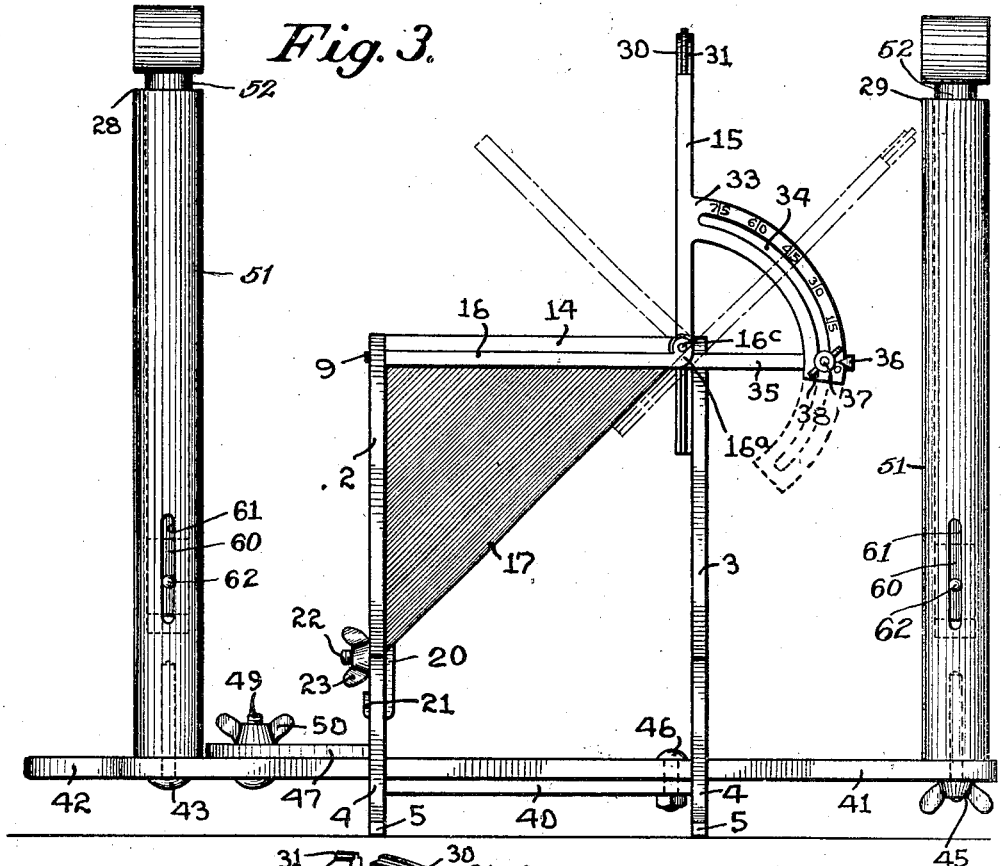
Figure 3 is an end view.
Figure 4:
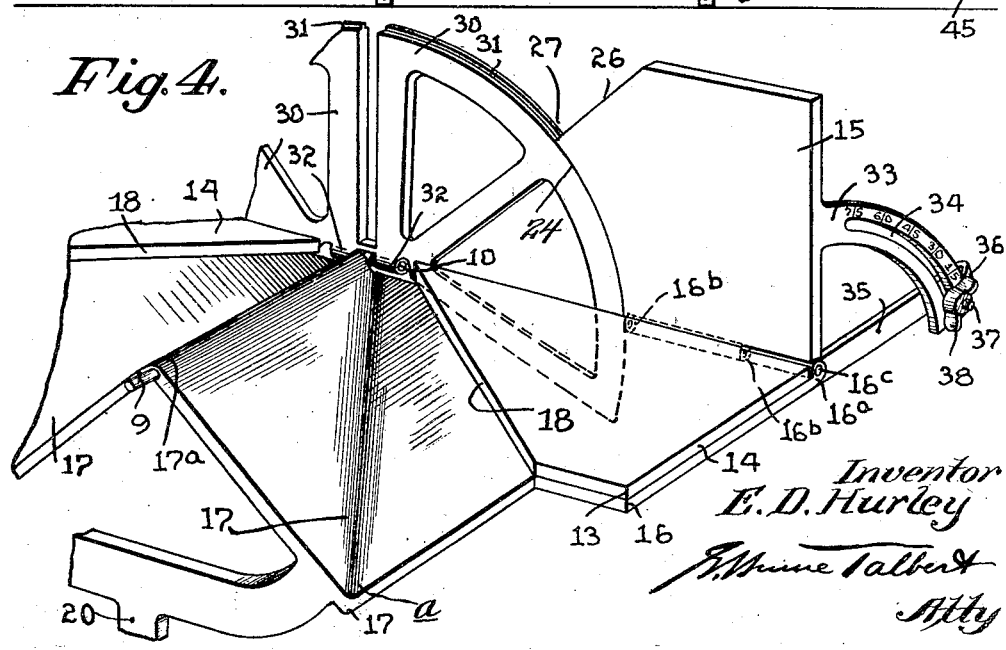
Figure 4 is an enlarged detail perspective view of one end of the material or work support, showing the mounting thereof and illustrating how the support is mounted for universal movement.

When the work support is tilted, as shown by dotted lines in the end view of Figure 3, with the right or left hand end of the sub-base tilted up, one or the other of the V-shaped cavities or depressions on the opposite sides of the fulcrum or rod 9 receives the cutting edge of the saw. It will be noted that the main base or work support 14 has a V-shaped cut-away portion 18 and, due to the V-shaped cavities or depressions on opposite sides of the shaft 9, sufficient space is afforded to permit the saw passing through the material without dulling the teeth.

The sub-base 16 has a tongue 20 merging in a cross bar (which connects the lower forward apexes of the depressions 17) and is constructed to overlie the protractor bar 6 (which is arcuate) and terminates in an indicator 21, there being a screw 22 passing through the tongue and through the slot 7 and provided with a thumb nut 23 to hold the entire work support in different adjusted positions.

The back 15 of the main base or work support is provided with arcuate edge portions 24 which have grooves 25 and merging from the upper ends of the arcuate edges and diverging are edges 26. By this construction, a cut-away portion 27 is formed in the back 15 of the main base or work support which permits of lateral movement of the saw blade when the sector 30 is tilted to the right or left when cutting at an angle with the work support tilted backward, as shown by dotted lines in Figure 3. The saw blade, in operation, moves in the guide posts 28 and 29.

The sector 30 (whose radius extends toward the rod or shaft 9) has on its edge an outstanding rib 31 which rides in or engages with the grooves 25 of the arcuate edges 24, so that the main base or work support may move tiltingly on the hinge pieces or rods 16ᶜ.

The sector 30 has fulcruming sleeves 32 which receive the transverse shaft or rod 10. The transverse shaft or rod 10 may be integral with the shaft 9 which is capable of a rotating movement in its bearing at the apex of the central V-shaped raised portion 17ᵃ, thereby permitting the sector 30 to tilt to the right or left when cutting at an angle with the work support tilted backward, as shown by dotted lines in Figure 3. In other words, the sector 30, while the work support is in the tilted position shown by dotted lines in Figure 3, may be tilted to the right or the left due to the shaft 9 being capable of rocking movement. However, as in Figure 6, it is preferable to secure the short shaft 10 to the shaft 9 by means of a set-screw with the shaft 9 stationary. This construction will allow the sector 30 to be tilted to the right or the left for the same purpose as above stated, but by means of the set-screw the sector, after being tilted to the right or the left, may be held in such titlted position.

The rear faces of the backs 15 have arcuate protractors 33 whose radii extend from the hinge rods or shafts 16ᶜ. These protractors have graduations and are slotted, as shown at 34, there being integral arms 35 carried by the rolls 16ᵃ and whose terminals overlie the protractors 33. The overlying parts of the arms terminate in indicators 36, there being screws 37 passing through the arms and provided with thumb nuts 38 to hold the protractors 33 in different positions, whereby their graduations may register with the indicators 36. In this way, the main base 13 is held in different tilted positions according to the miter desired to be formed upon the work. The work may be mitred in order that the cut may be formed on one angle by tilting the main base 13 and at the same time constructing the miter on another angle by tilting the sub-base 16. The sub-base may remain fixed in a horizontal position and allow the main base 13 to be tilted in order to cut a plain miter.

The legs of the forward and rear uprights have integral connecting bars 39 which are, in turn, integrally connected by a forwardly extending bar 40 and fulcrumed upon the bar 40 for tilting movement is a bar 41, the forward end of which has a handle 42. The forward guide post 28 is riveted, as at 43, to the forward end of the bar 41, the rear end of which is provided with a slot 44 through which a thumb screw 45 extends. This thumb screw threads into the lower end of the rear guide post 29 for the purpose of holding the guide post in different adjusted positions.

The fulcrum 46 of the bar 41 is directly under the fulcrum or rod 9, so that it is possible to tilt the bar 41 in a horizontal direction, that is, on a vertical axis. The legs of the forward upright are connected integrally by an additional protractor bar 47 provided with a slot 48 and whose radius extends from the fulcrum 46. Engaged through the bar 41 and through the slot 48 is a screw 49 provided with a thumb nut 50 for holding the bar 41 in different positions.

Each guide post 28 and 29 comprises the two sections 51 and 52, the latter telescopically engaging within the former. The two sections are slotted, as at 53, for the reception of a saw blade, the back edge of which has a rib 55 which engages with the enlarged opening 56 of the slot of the section 52. The lower portion of the wall of the section 51 has a slot 61 and slidably fitting the bore of the section 51 is an abutment 60 upon which the lower end of the section 52 may engage for limiting the section 52 in its gradual lowering movement, as the saw blade is passing through the material being cut.

It will be noted that the abutment 60 may be secured in different adjusted positions by means of the thumb screw 62$^a$, it being obvious that the abutment may be set so that the lower extremity of the section 52 may engage with the abutment before it is possible for the toothed edge of the saw to engage with the apex of the central V-shaped raised portion of the sub-base. In fact, the abutment may be used for limiting the section 52 in its lowering movement before the toothed edge of the saw engages with the inclined surfaces of the V-shaped cavities or depressions 17. In this way, it is possible to additionally prevent the dulling of the saw teeth and yet permit the teeth to pass entirely through the material or work being cut. The abutment 60 has a handle 62 in the form of a pin which is threaded into the abutment. This handle operates through the slot 61 so that the abutment may be moved in any desired position.

Secured at 64 to the wall of the section 51 of each saw guide is a rocking member 63. In fact, the member 63 is loose enough on its fastening means to permit of a very slight oscillatory movement. This member 63 has a detent pin 63$^a$ which engages through the wall of the section 51 and bears against the wall of the section 52 during its vertical movement. However, the engagement of the detent pin is not sufficient to retard the action of the section 52 as the saw advances through the material being cut. A suitable coil spring 65 is interposed between one end of the member 63 and the wall of the section 61 to urge the detent pin 63$^a$ toward the wall of the section 52. It will be noted that the section 52 may be raised sufficiently so that its lower end is above the detent pin 63$^a$, allowing the pin to engage under the section 52 and thereby hold the same raised while placing material in position to be cut.

The work or material may be provided with a miter formed on one angle by tilting the bar 41 and to form this miter on an additional angle, the main base 13 may be tilted on the rods or hinge pins 16$^c$, it being possible to construct the miter on a still additional angle by tilting the sub-base on its fulcrum or shaft 9. Obviously, the material may be adjusted universally with respect to the fulcrum or shaft 9. The sector 30 has a vertical slot 57 through which the saw blade travels when operating back and forth through the guides of the guide posts 28 and 29.

The invention having been set forth, what is claimed is:

1. A miter machine including a frame, a work support comprising a main base and a sub-base adjustably mounted on the frame and one on the other respectively for adjusting the work universally to provide the work with miters constructed on one or more angles, and saw guides for guiding a saw blade, the sub-base being provided with V-shaped depressions one on each side of the fulcrum of the sub-base to afford means to make room for the cutting edge of a saw blade to permit the saw teeth to pass entirely through the work to be mitred.

2. A miter machine comprising a base and a back at right angles thereto and tiltable about a longitudinal axis coinciding substantially with the vertex of said angle, and a saw guide, said guide and said base being adjustable one with reference to the other on an axis at right angles to that of the first mentioned axis and also on an axis at right angles to each of the other axes.

3. In a miter machine, the combination with a frame, of a sub-base tiltable on an axis at right angles to the work, a main base comprising bottom and back members positioned substantially at right angles to each other with a longitudinal axis coinciding substantially with the vertex of the backs of the main base, said longitudinal axis being parallel with the work and at right angles to the first axis, and a saw guide carrying frame supported on the main frame on an axis intersecting the junction of the first and second axes, whereby the sub-base and the main base may tilt on their respective axes and the saw guide carrying frame on its axis coincident to the intersection of the first and second axes.

4. In a miter machine, a frame, a sub-base mounted for tilting movement on an axis at right angles to the work, a main base comprising bottom and back members rigidly at right angles to each other and provided with a longitudinal axis at the junction of the bottoms and the back coincident to the vertex of the back, said longitudinal axis being at right angles to the first axis, means for holding the main base in different adjusted positions, and a saw guide carrying frame mounted on an axis coincident with and below the intersection of the first two axes, whereby the sub and main bases may tilt on their respective axes and the last mentioned frame on its axis coincident to the intersection of the first two axes.

In testimony whereof he affixes his signature.

ELMER D. HURLEY.